United States Patent
Ueda

(10) Patent No.: US 9,009,515 B2
(45) Date of Patent: Apr. 14, 2015

(54) ELECTRONIC DEVICE, IMAGE PROCESSING APPARATUS, AND DEVICE CONTROL METHOD

(71) Applicant: Shigeo Ueda, Kanagawa (JP)

(72) Inventor: Shigeo Ueda, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 246 days.

(21) Appl. No.: 13/765,802

(22) Filed: Feb. 13, 2013

(65) Prior Publication Data

US 2013/0212418 A1 Aug. 15, 2013

(30) Foreign Application Priority Data

Feb. 15, 2012 (JP) ................................. 2012-030937

(51) Int. Cl.
*G06F 1/32* (2006.01)
*G06F 1/26* (2006.01)

(52) U.S. Cl.
CPC .............. *G06F 1/3287* (2013.01); *G06F 1/263* (2013.01); *G06F 1/3209* (2013.01)

(58) Field of Classification Search
CPC ...... G06F 1/263; G06F 1/3209; G06F 1/3287
USPC ....................................................... 713/323
See application file for complete search history.

(56) References Cited

U.S. PATENT DOCUMENTS

| 8,078,892 B2 * | 12/2011 | Satoh ............................ 713/320 |
| 2008/0133953 A1 | 6/2008 | Kawaji |
| 2010/0007914 A1 * | 1/2010 | Watanabe ..................... 358/1.15 |

FOREIGN PATENT DOCUMENTS

| JP | 2008-068548 | 3/2008 |
| JP | 4275168 | 3/2009 |
| JP | 2010-141881 | 6/2010 |
| JP | 2010-160550 | 7/2010 |

* cited by examiner

*Primary Examiner* — Albert Wang
(74) *Attorney, Agent, or Firm* — Harness, Dickey & Pierce, P.L.C.

(57) ABSTRACT

According to an embodiment, provided is an electronic device that includes: an energy generation unit that generates electrical power; an accumulating unit that accumulates therein the electrical power generated by the energy generation unit; and a network control unit that includes: a first function unit that performs network response processing; a second function unit that performs network response processing with a relatively smaller processing load than the network response processing performed by the first function unit; and a third function unit that controls the electrical power supply to the function units. The third function unit stops the electrical power supply to the first function unit in a predetermined standby operation mode that is standby for a network response request, and supplies the electrical power to the second function unit directly from the energy generation unit bypassing the accumulating unit.

11 Claims, 6 Drawing Sheets

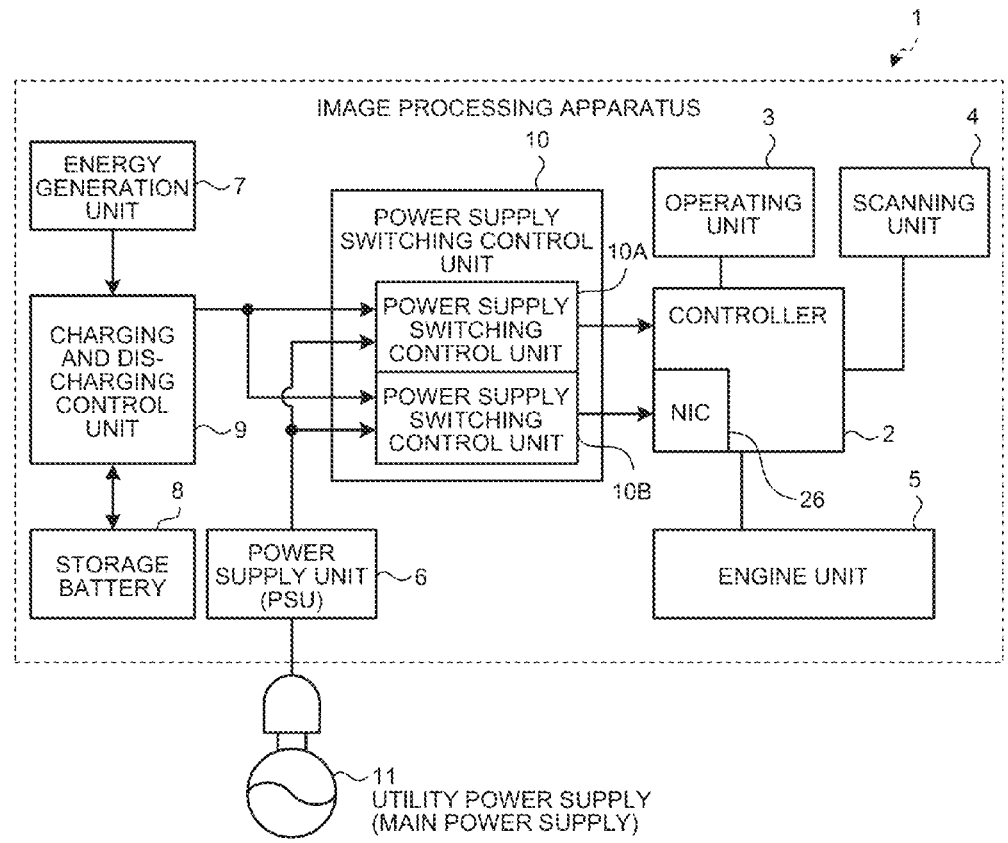
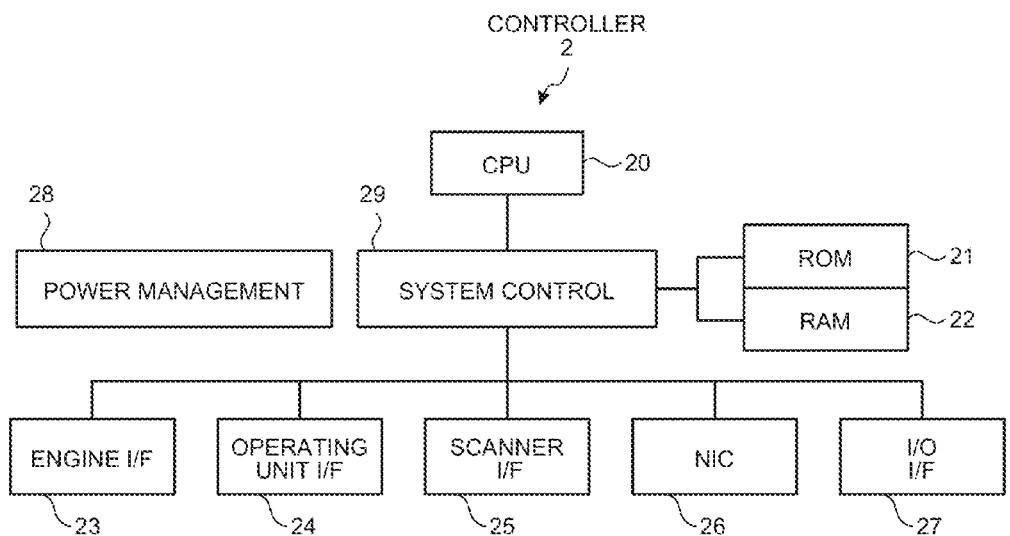

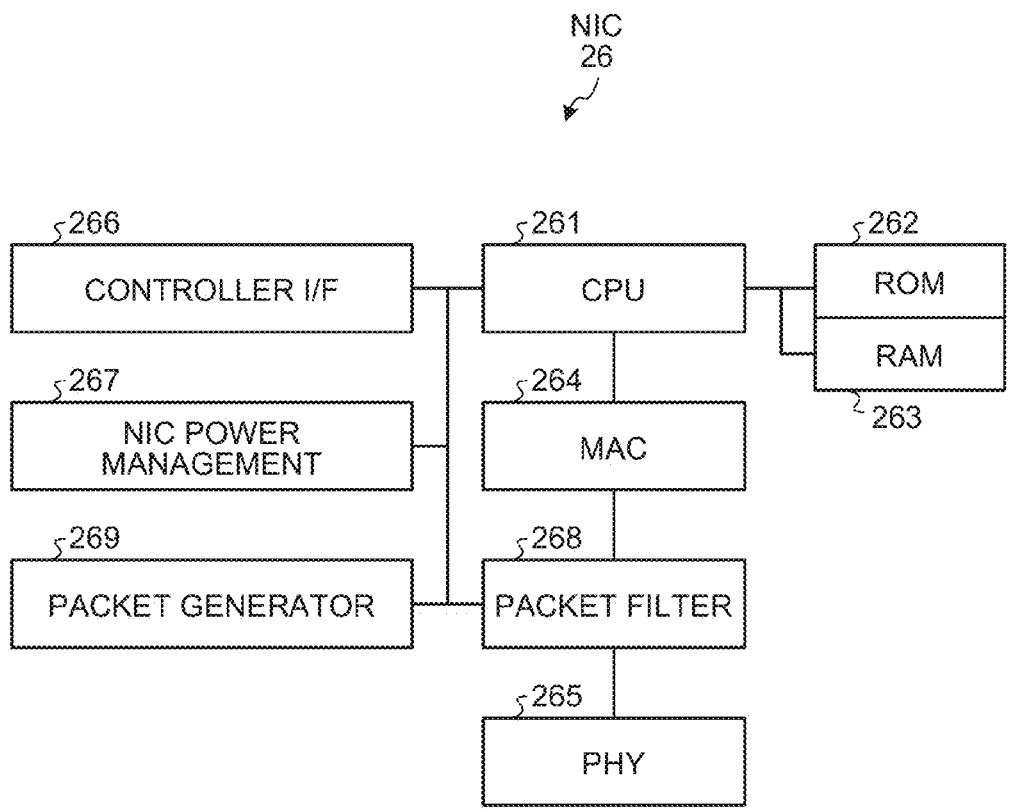
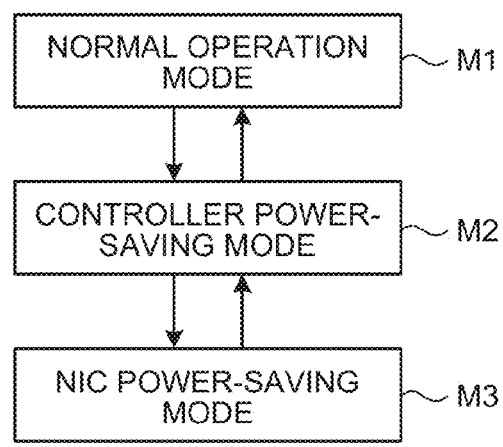

(DIAGRAM OF STATE OF ELECTRICAL POWER SUPPLY FOR MODULES OF CONTROLLER IN CONTROLLER POWER-SAVING MODE)

(DIAGRAM OF STATE OF ELECTRICAL POWER SUPPLY
FOR MODULES OF NIC IN NIC POWER-SAVING MODE)

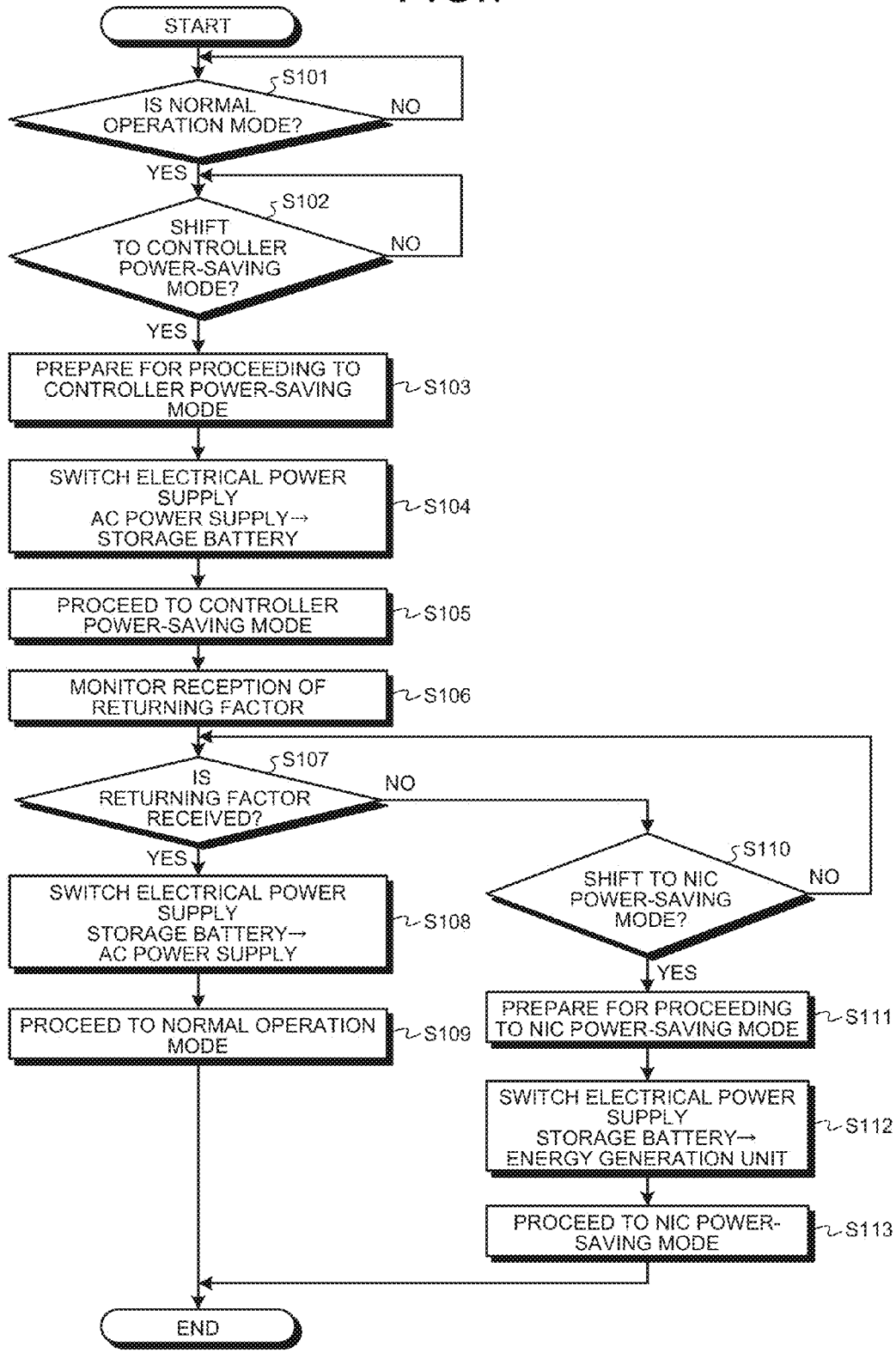

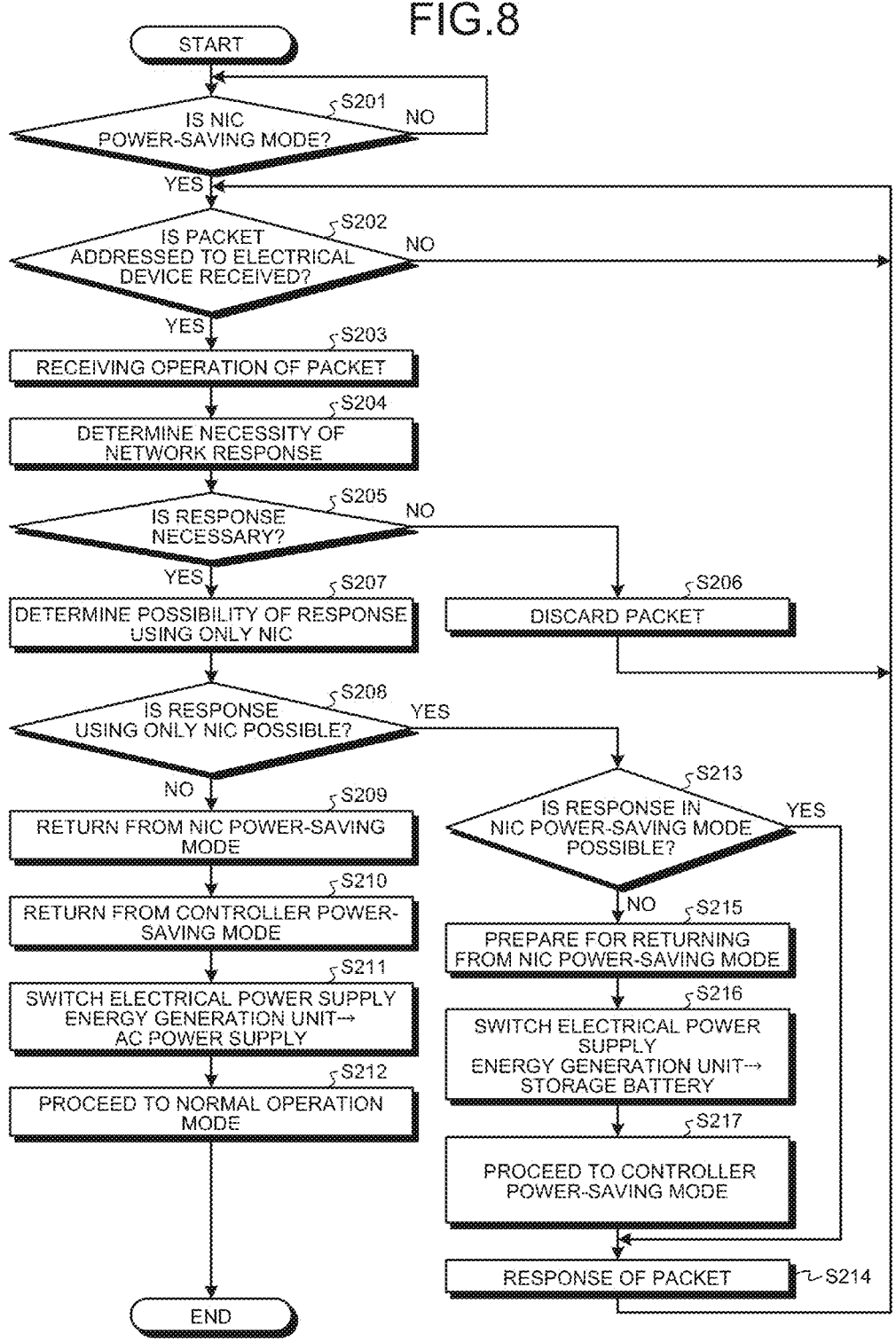

ELECTRONIC DEVICE, IMAGE PROCESSING APPARATUS, AND DEVICE CONTROL METHOD

CROSS-REFERENCE TO RELATED APPLICATIONS

The present application claims priority to and incorporates by reference the entire contents of Japanese Patent Application No. 2012-030937 filed in Japan on Feb. 15, 2012.

BACKGROUND OF THE INVENTION

1. Field of the Invention

An embodiment of the present invention relates to an electronic device, an image processing apparatus, and a device control method.

2. Description of the Related Art

Recently, as for office devices such as a laser printer (LP) and a digital multi-function peripheral (MFP) (hereinafter, simply referred to as an electronic device), reducing the electrical power consumption during operation or during standby operation mode has been preferred. Accordingly, the electronic device generally includes a power saving mode (also referred to as a sleep mode) that shuts off the electrical power supply to the load that is not used during the standby mode or delays the operation of a central processing unit (CPU).

An electronic device that includes a storage battery for accumulating electrical energy (electrical power) generated by energy generation technologies such as a photovoltaic cell, a fuel cell, motive power conversion, and thermoelectric conversion has been also known for recent years. In such an electronic device, in a normal operation mode, an apparatus operates with the electrical power supplied from the utility power supply serving as an alternating current (AC) power supply; and in a standby operation mode, the apparatus operates with the electrical power supplied from the storage battery. With this structure, the electrical power consumption of the utility power supply in the standby operation mode is intended to be 0 W.

In the related art, a digital MFP is also known that performs power saving processing in which the electrical power supply to the modules therein such as a CPU, a ROM, a RAM, and an encryption chip of a network interface card (NIC) are stopped, when a processing load of a network service request such as a color scanning request is small (refer to Japanese Patent No. 4275168).

In the above-described energy generation technologies, however, the conversion efficiency is low, being 10 to 15% as for a photovoltaic cell and 20 to 30% as for thermoelectric conversion, for example. Thus, it takes a much time to accumulate electrical power into the storage battery. Moreover, the electrical power accumulated in the storage battery is consumed in a short time. For this reason, in the electronic device that operates with the electrical power accumulated in the storage battery without using the electrical power supplied from the utility power supply in the standby operation mode described above (also referred to as a non-consuming system for energy saving), if the electrical power of the storage battery is used continuously for operations during the standby such as a network response in the standby operation mode, the electrical power of the storage battery is exhausted in a short time. When the electrical power of the storage battery is exhausted, the electronic device operates with the electrical power supplied from the utility power supply. Therefore, in the related art, the time period in which the power consumption of the utility power supply is 0 W in the standby operation mode (also referred to as non-consuming for energy saving) is short, whereby a problem occurs in that energy saving cannot be fully achieved.

The problem also occurs even if the technology disclosed in the Japanese Patent No. 4275168 described above is applied to the non-consuming system for energy saving.

There is a need to provide an electronic device, an image processing apparatus, and a device control method capable of achieving further energy saving than the related art by maintaining a longer time period in which the power consumption of the utility power supply is 0 W in the standby operation mode.

SUMMARY OF THE INVENTION

It is an object of the present invention to at least partially solve the problems in the conventional technology.

According to an embodiment, provided is an electronic device that includes: an energy generation unit that generates electrical power; an accumulating unit that accumulates therein the electrical power generated by the energy generation unit; and a network control unit that includes: a first function unit that performs network response processing; a second function unit that performs network response processing with a relatively smaller processing load than the network response processing performed by the first function unit; and a third function unit that controls the electrical power supply to the function units. The third function unit stops the electrical power supply to the first function unit in a predetermined standby operation mode that is standby for a network response request, and supplies the electrical power to the second function unit directly from the energy generation unit bypassing the accumulating unit.

According to another embodiment, provided is an image processing apparatus that includes: an energy generation unit that generates electrical power; an accumulating unit that accumulates therein the electrical power generated by the energy generation unit; a network control unit that comprises: a first function unit that performs network response processing; a second function unit that performs network response processing with a relatively smaller processing load than the network response processing performed by the first function unit; and a third function unit that controls the electrical power supply to the function units; and an image processing unit that performs image processing. The third function unit stops the electrical power supply to the first function unit in a predetermined standby operation mode that is standby for a network response request, and supplies the electrical power to the second function unit directly from the energy generation unit bypassing the accumulating unit.

According to still another embodiment, provided is a device control method executed by an electronic device that includes: an energy generation unit that generates electrical power; an accumulating unit that accumulates therein the electrical power generated by the energy generation unit; and a network control unit that includes: a first function unit that performs network response processing; a second function unit that performs network response processing with a relatively smaller processing load than the network response processing performed by the first function unit; and a third function unit that controls the electrical power supply to the function units. The device control method includes: stopping, by the third function unit, the electrical power supply to the first function unit in a predetermined standby operation mode that is standby for a network response request, and supplying the electrical power to the second function unit directly from the energy generation unit bypassing the accumulating unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram of the schematic hardware structure of an image processing apparatus according to an embodiment;

FIG. 2 is a block diagram of the structure of a controller of the image processing apparatus;

FIG. 3 is a block diagram of the structure of a network interface card (NIC) of the image processing apparatus;

FIG. 4 is a diagram of the operation modes and the state transition therebetween in the image processing apparatus according to the embodiment;

FIG. 7 is a flowchart of processing operations in the image processing apparatus according to the embodiment; and FIG. 8 is another flowchart of processing operations in the image processing apparatus according to the embodiment.

DETAILED DESCRIPTION OF THE PREFERRED EMBODIMENTS

Figure 5:
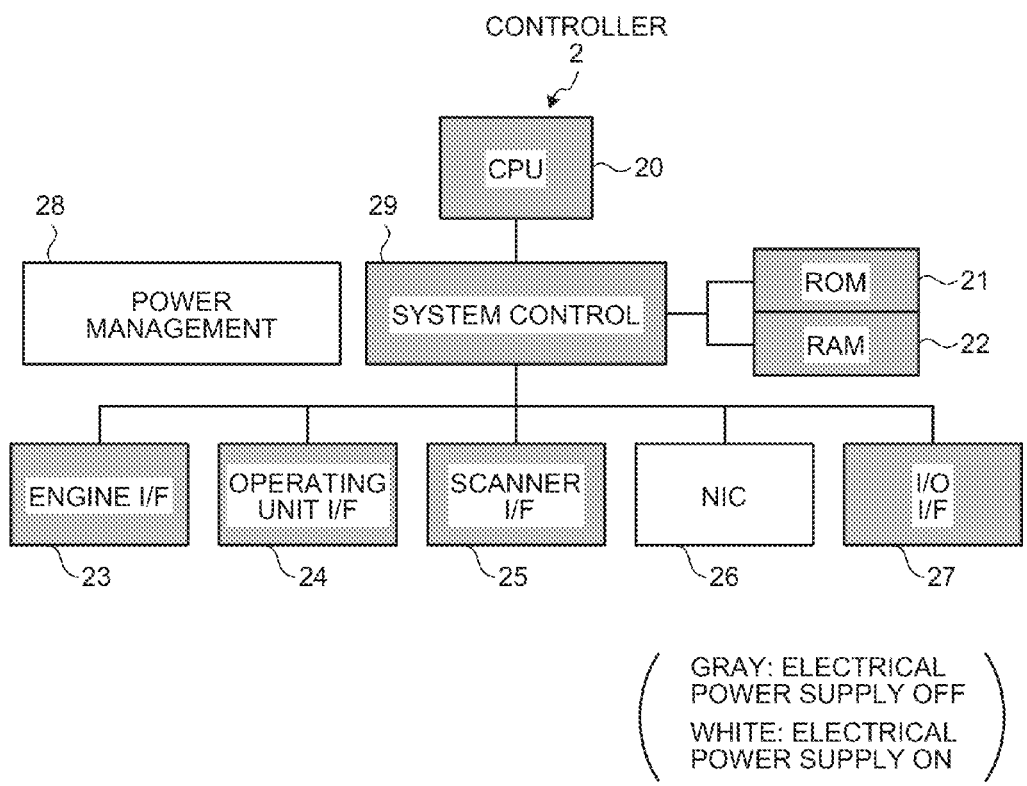
FIG. 5 is a block diagram for explaining a controller power-saving mode.

An embodiment will now be described with reference to the accompanying drawings.

An electronic device, an image processing apparatus, and a device control method according to the present embodiment can be applied to various types of electronic devices such as a digital multi function peripheral (MFP) having two or more functions of a printer, a scanner, a facsimile machine, and a file server. An example applied to an image forming apparatus serving as a digital multi function peripheral will be described hereafter.

The schematic hardware structure of an image processing apparatus 1 according to the embodiment will first be described with reference to FIG. 1.

As illustrated in FIG. 1, the image processing apparatus 1 of the present embodiment mainly includes a controller 2, an operating unit 3, a scanning unit 4, an engine unit 5, a power supply unit (PSU) 6, an energy generation unit 7, a storage battery 8, a charging and discharging control unit 9, and a power supply switching control unit 10.

The controller 2 controls processing operations of the image processing apparatus 1 overall. The controller 2 includes a network interface card (NIC) 26 as a network control unit that controls the connection of a network (not illustrated) such as a local area network (LAN) coupled to the image processing apparatus 1.

The operating unit 3 is a user interface that displays information relating to various types of settings such as a print setting, a communication setting, and receives an operation input by a user relating to the various types of settings described above.

The scanning unit 4 includes a scanning device (not illustrated) such as a charge coupled device (CCD) and reads an image data of the document that has been set on an automatic document feeder (ADF) or an exposure glass (none of them illustrated) using the scanning unit.

The engine unit 5 is a printer including a monochrome plotter, a color plotter, an application specific integrated circuit (ASIC), and a fixing unit (none of them illustrated), for example. The engine unit 5 performs various types of image processing such as error diffusion or gamma conversion on the image data of the images that has been read by the scanning unit 4 or image data that has been received from an external device (not illustrated) through the network (not illustrated). Then, the engine unit 5 forms images on a recording medium based on the resulting image data.

The power supply unit 6 generates a direct current (DC) voltage as electrical power to be supplied to the loads in the apparatus based on an alternating current (AC) voltage as electrical power supplied by a utility power supply (also referred to as an AC power supply) 11 serving as a main power supply.

The energy generation unit 7 generates electrical energy (the electrical power) using energy generation technologies such as a photovoltaic cell, a fuel cell, motive power conversion, and thermoelectric conversion.

The storage battery 8 is an accumulating unit as a standby power supply that accumulates the electrical power (electrical charge) used when the image processing apparatus 1 is in a standby mode, that is, a controller power-saving mode M2 (refer to FIG. 4), which will be described later. The storage battery 8 of the present embodiment accumulates therein the electrical power generated by the energy generation unit 7.

The charging and discharging control unit 9 charges the storage battery 8 based on the electrical power generated by the energy generation unit 7 or switches the electrical power supply to the loads such as the controller 2 between the electrical power supply from the storage battery 8 and the electrical power supply directly from the energy generation unit 7 (bypassing the storage battery 8).

The power supply switching control unit 10 switches the electrical power supply to the loads to any one of the electrical power supply from the power supply unit 6, the electrical power supply from the storage battery 8, and the electrical power supply from the energy generation unit 7, and controls turning off the electrical power supply to the loads.

The power supply switching control unit 10 of the present embodiment includes two modules: a power supply switching control unit 10A and a power supply switching control unit 10B. The power supply switching control unit 10A controls the electrical power supply to the controller 2, in particular, the modules other than the NIC 26 in the controller 2 (also referred to as function units) (refer to FIG. 2). The power supply switching control unit 10B controls the electrical power supply to the NIC 26.

By dividing the power supply switching control unit 10 into two modules, when the image processing apparatus 1 proceeds to the standby mode, that is, the controller power-saving mode M2, the electrical power supply to the NIC 26 that performs a network response can be maintained; and the electrical power supply to the modules of the controller 2 unnecessary for the network response (also referred to as function units) (refer to FIG. 2) can be shut off, whereby the electrical power supply to the loads such as the operating unit 3, the scanning unit 4, and the engine unit 5 can be shut off. The electrical power supply to the operating unit 3, the scanning unit 4, and the engine unit 5 is controlled by the controller 2.

The structure of the controller 2 will now be described in detail with reference to FIG. 2.

As illustrated in FIG. 2, the controller 2 includes a plurality of modules (function units) such as a central processing unit (CPU) 20, a read only memory (ROM) 21, a random access memory (RAM) 22, an engine interface (I/F) 23, an operating unit I/F 24, a scanner I/F 25, the above-described NIC 26, an I/O interface 27, a power management 28, and a system control 29.

The CPU 20 controls main processing of the image processing apparatus 1. The ROM 21 stores therein various types of data and programs used by the CPU 20. The RAM 22 is a memory module that secures a working area.

The engine I/F 23 is an interface for coupling the controller 2 and the engine unit 5. The operating unit I/F 24 is an interface for coupling the controller 2 and the operating unit 3. The scanner I/F 25 is an interface for coupling the controller 2 and the scanning unit 4.

The NIC 26 is the network control unit described above.

The I/O interface 27 is an interface for coupling any input and output (I/O) device other than the operating unit 3, the scanning unit 4, and the engine unit 5 to the controller 2.

The power management 28 controls turning on and off the electrical power supply to the modules of the controller 2.

The system control 29 controls the flow of data between the modules in the controller 2.

The structure of the NIC 26 will now be described in detail with reference to FIG. 3.

As illustrated in FIG. 3, the NIC 26 includes a plurality of modules (function units) such as a CPU 261, a ROM 262, a RAM 263, a media access control (MAC) 264, a physical layer (PHY) 265, a controller I/F 266, a NIC power management 267, a packet filter 268, and a packet generator 269.

The CPU 261 controls overall processing operations of the NIC 26. The ROM 262 stores therein various types of data and programs used by the CPU 261. The RAM 263 is a memory module that secures a working area.

The MAC 264 is a logic control unit for a network that performs control relating to a MAC layer, that is, an analysis of a network packet and transmission of data to a memory module. The PHY 265 transmits and receives a packet to the network coupled to the electronic device; serves as a control unit for a network physical layer that performs the control relating to the physical layer; and converts data between the data on the transmission path side (an optical signal or an electrical signal) and the data on the side of the image processing apparatus 1 (a logic signal).

The controller I/F 266 is an interface for coupling the NIC 26 to the system control 29.

The NIC power management 267 controls turning on and off the electrical power supply to the modules of the NIC 26.

The packet filter 268 filters network packets that have been received.

Specifically, the packet filter 268 determines a communication protocol (also referred to as a network protocol) of the packet that has been received in the NIC power-saving mode M3 (refer to FIG. 4), which will be described later; and determines whether the packet is addressed to the electronic device. If the packet filter 268 then determines that the received packet is not addressed to the electronic device, the packet filter 268 discards the received packet.

If the packet filter 268 determines that the received packet is addressed to the electronic device, the packet filter 268 determines whether the packet can respond without starting up the CPU 261. If the packet filter 268 determines that the packet cannot respond without starting up the CPU 261, the packet filter 268 notifies the NIC power management 267 of that effect. If the packet filter 268 determines that the packet can respond without starting up the CPU 261, the packet filter 268 sends the packet to the packet generator 269.

The packet generator 269 generates a packet that responds without starting up the CPU 261 in the NIC power-saving mode M3 (refer to FIG. 4) and sends the packet. Specifically, the packet generator 269 extracts the necessary data for a response out of the data of the packet forwarded by the packet filter 268; then generates a response packet; and sends the generated response packet to the network (not illustrated) through the packet filter 268 and the PHY 265.

That is to say, in the NIC 26 according to the present embodiment, the CPU 261 and so forth serve as a first function unit that performs network response processing with a relatively large processing load out of processing of a plurality of network responses performed by the NIC 26. The packet filter 268, the packet generator 269, and so forth serve as a second function unit that performs network response processing with a relatively smaller processing load than the network response processing performed by the above-described first function unit. The NIC power management 267 serves as a third function unit.

Although the packet filter 268 and the packet generator 269 may include a CPU, the packet filter 268 and the packet generator 269 include a simple logic circuit for the purpose of reducing the electrical power consumption of the storage battery 8 in the standby operation mode in the present embodiment.

The operation modes and the state transition therebetween in the image processing apparatus 1 according to the present embodiment will now be described with reference to FIGS. 4 to 6.

As illustrated in FIG. 4, in the image processing apparatus 1 according to the present embodiment, three types of operation modes are available, that is, a normal operation mode M1, the controller power-saving mode M2, and the NIC power-saving mode M3.

The normal operation mode M1 is an operation mode in which the scanning unit 4 performs a reading operation or the engine unit 5 performs an image forming operation, for example, or an operation mode in which the above-described reading operation or the above-described image forming operation is not performed for a certain time, with the electrical power supplied by the power supply unit 6 to all of the modules (refer to FIG. 2) (including all of the modules in the NIC 26) included in the controller 2 (in other words, with the electrical power supplied by the utility power supply 11). In the normal operation mode M1, the electrical power is supplied by the power supply unit 6 only to a function processing unit (load) to be used out of the operating unit 3, the scanning unit 4, and the engine unit 5. The normal operation mode M1 is the most power-consuming mode out of the three types of the operation modes.

The image processing apparatus 1 according to the present embodiment proceeds to the controller power-saving mode M2 when neither a user operation such as an operation through the operating unit 3 and a lifting operation of an ADF (not illustrated) for exposing the exposure glass (not illustrated), nor a request for using the image processing apparatus 1 such as a printing request through the network (not illustrated) and a timer reservation exists for a certain time period in the normal operation mode M1.

Figure 6:
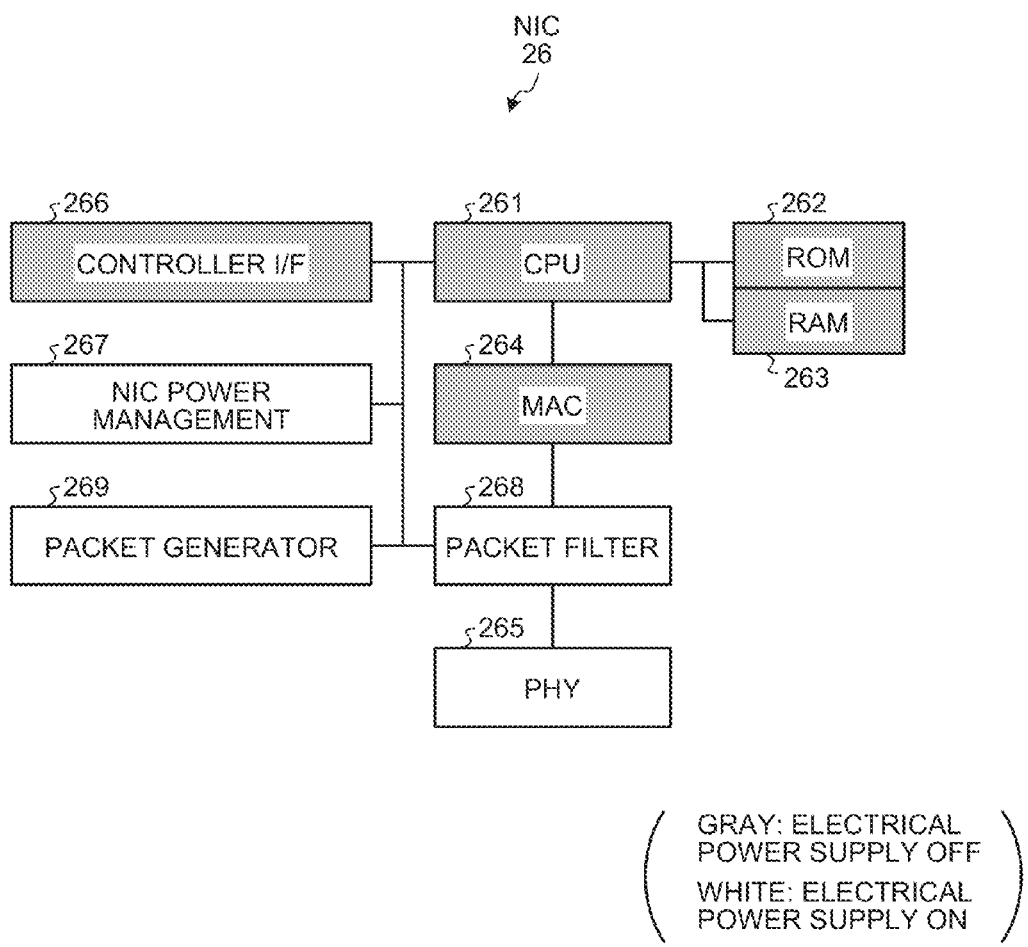
FIG. 6 is a block diagram for explaining a NIC power-saving mode.

The controller power-saving mode M2 is a first standby operation mode in which, as illustrated in FIG. 5, the electrical power is supplied from the storage battery 8 through the charging and discharging control unit 9 only to the NIC 26 and the power management 28, which are illustrated with white boxes in FIG. 5, out of the modules of the controller 2; and no electrical power is supplied to the CPU 20, the ROM 21, the RAM 22, the engine I/F 23, the operating unit I/F 24, the scanner I/F 25, the I/O interface 27, and the system control 29, which are illustrated with gray boxes; thus only the NIC 26 and the power management 28 are operable. In the controller power-saving mode M2, no electrical power is supplied to the operating unit 3, the scanning unit 4, and the engine unit 5.

The image processing apparatus 1 according to the present embodiment proceeds to the NIC power-saving mode M3 if no network communication request is present for a certain time in the controller power-saving mode M2. On the other hand, the image processing apparatus 1 according to the present embodiment proceeds to (returns to) the normal operation mode M1 if the above-described request for using the image processing apparatus 1 is issued in the controller power-saving mode M2.

The NIC power-saving mode M3 is a second standby operation mode in which the electrical power is supplied from the energy generation unit 7 through the charging and discharging control unit 9 only to the NIC 26 and the power management 28 out of the modules included in the controller 2. Specifically in the NIC 26, as illustrated in FIG. 6, the electrical power is supplied from the energy generation unit 7 through the charging and discharging control unit 9 only to the PHY 265, the NIC power management 267, the packet filter 268, and the packet generator 269, which are illustrated with white boxes, out of the modules included in the NIC 26; and no electrical power is supplied to the CPU 261, the ROM 262, the RAM 263, the MAC 264, and the controller I/F 266, which are illustrated with gray boxes; thus only the PHY 265, the NIC power management 267, the packet filter 268, and the packet generator 269 are operable. In the NIC power-saving mode M3, no electrical power is supplied to the operating unit 3, the scanning unit 4, and the engine unit 5. The NIC power-saving mode M3 is the least power-consuming mode out of the three types of the operation modes.

The image processing apparatus 1 according to the present embodiment proceeds to the controller power-saving mode M2 if the received packet, addressed to the electronic device, cannot respond in the NIC power-saving mode M3. If the above-described request for using the image processing apparatus 1 is issued in the NIC power-saving mode M3, the image processing apparatus 1 proceeds to the controller power-saving mode M2, and then to the normal operation mode M1.

In the image processing apparatus 1 according to the present embodiment, if the electrical power supply from the storage battery 8 becomes (or is about to become) unstable in the above-described controller power-saving mode M2, the electrical power supply to the loads is switched to the electrical power supply from the utility power supply 11 under the control of the controller 2 or the power supply switching control unit 10.

In the image processing apparatus 1 according to the present embodiment, if the electrical power supply from the energy generation unit 7 becomes (or is about to become) unstable in the above-described NIC power-saving mode M3, the electrical power supply to the loads is switched to the electrical power supply from the storage battery 8 or the electrical power supply from the utility power supply 11 under the control of the controller 2 or the power supply switching control unit 10.

The processing operations in the image processing apparatus 1 according to the present embodiment will now be described with reference to FIGS. 7 and 8.

The procedure of processing operations when the normal operation mode M1 proceeds to another operation mode, that is, the controller power-saving mode M2 or the NIC power-saving mode M3, will first be described with reference to the flowchart in FIG. 7.

As illustrated in FIG. 7, in the image processing apparatus 1 in the normal operation mode M1 (Yes at Step S101), it is determined whether the normal operation mode M1 needs to be shifted to the controller power-saving mode M2 depending on whether the request for using the image processing apparatus 1 is issued within a certain period under the control of the CPU 20 (Step S102).

If it is determined that the normal operation mode M1 needs to be shifted to the controller power-saving mode M2 because no request for using the image processing apparatus 1 is issued within the certain period (Yes at Step S102), the data stored in the RAM 22 or another memory module in the controller 2 is moved to an HDD (not illustrated), for example, to prepare for proceeding to the controller power-saving mode M2 (Step S103).

Subsequently, under the control of the CPU 20, the power supply switching control unit 10 switches the electrical power supply to the loads in the controller 2, for example, from the electrical power supply from the power supply unit 6 to the electrical power supply from the storage battery 8 (Step S104). After that, the image processing apparatus 1 proceeds to the controller power-saving mode M2 (Step S105) and operates with the electrical power supplied from the storage battery 8.

Then, in the image processing apparatus 1, reception of a returning factor within a certain period is monitored in the controller power-saving mode M2 (Step S106). Specifically, at Step S106, the power management 28 monitors reception of a user operation as a returning factor within a certain period and the NIC 26 monitors reception of a network response request as a returning factor within a certain period.

If a returning factor is received as a result of the monitoring (Yes at Step S107), in the image processing apparatus 1, the power supply is switched for returning to the normal operation mode M1 (Step S108). That is to say, at Step S108, in the image processing apparatus 1, the electrical power supply to the loads in the controller 2, for example, is switched from the electrical power supply from the storage battery 8 to the electrical power supply from the power supply unit 6.

After that, the image processing apparatus 1 proceeds from the controller power-saving mode M2 to the normal operation mode M1 (Step S109) and the processing is completed.

If no returning factor is received as a result of the monitoring at Step S106 within a certain period (No at Step S107), in the image processing apparatus 1, it is determined that the controller power-saving mode M2 needs to be shifted to the NIC power-saving mode M3 (Yes at Step S110). Subsequently, the data stored in the RAM 263 of the NIC 26 or another memory module is moved to an HDD (not illustrated) to ensure the safety of the data, for example, to prepare for proceeding to the NIC power-saving mode M3 (Step S111).

After that, the power supply switching control unit 10 switches the electrical power supply to the loads in the controller 2, for example, from the electrical power supply from the storage battery 8 to the electrical power supply from the energy generation unit 7 (Step S112). After that, the image processing apparatus 1 proceeds to the NIC power-saving mode M3 (Step S113), and operates with the electrical power supplied from the energy generation unit 7.

The procedure of processing operations when the packet is received in the NIC power-saving mode M3 will now be described with reference to the flowchart in FIG. 8.

As illustrated in FIG. 8, in the image processing apparatus 1 in the NIC power-saving mode M3 (Yes at Step S201), the packet filter 268 monitors reception of the packet from the network (not illustrated). If it is determined that the packet addressed to the electronic device is received (Yes at Step S202), receiving operation is performed, in which the packet addressed to the electronic device is temporarily stored in the RAM 263 or another memory module (Step S203). Subsequently, the packet filter 268 determines whether the received packet needs any response (Step S204).

If it is determined that the packet does not need any response (No at Step S205), the packet filter 268 discards the received packet (Step S206), and the image processing apparatus 1 returns the processing to Step S202 to monitor the reception of a packet again.

If it is determined that the packet needs a response (Yes at Step S205), the packet filter 268 subsequently determines whether the packet can respond using only the NIC 26 without the CPU 20 of the controller 2, depending on the hardware processing load corresponding to the type of the communication protocol of the received packet (Step S207).

As a result, if the packet filter 268 determines that the packet cannot respond using only the NIC 26 without the CPU 20 of the controller 2 because the received packet cannot respond without starting up the CPU 20 of the controller 2 (No at Step S208), the image processing apparatus 1 returns from the NIC power-saving mode M3 and proceeds to the controller power-saving mode M2 (Step S209). Subsequently, the image processing apparatus 1 returns from the controller power-saving mode M2 (Step S210); and the power supply switching control unit 10 switches the electrical power supply to the loads from the electrical power supply from the energy generation unit 7 to the electrical power supply from the power supply unit 6 under the control of the CPU 20 of the controller 2 (Step S211). After that, the image processing apparatus 1 proceeds to the normal operation mode M1 (Step S212) and operates with the electrical power supplied from the power supply unit 6.

As a result of the determination at Step S207, if the packet filter 268 determines that the packet can respond using only the NIC 26 because the received packet can respond without starting up the CPU 20 of the controller 2 (Yes at Step S208), the packet filter 268 subsequently determines whether the packet can respond in the NIC power-saving mode M3, that is to say, without using the CPU 261 of the NIC 26 based on the type of the communication protocol of the received packet (Step S213).

As a result of the determination above, if the packet filter 268 determines that the packet can respond in the NIC power-saving mode M3 (Yes at Step S213) because the received packet is a packet that can respond without using the CPU 261 of the NIC 26, e.g., an address resolution protocol (ARP) request packet or a packet internet groper (Ping) packet, the NIC 26 responses in the NIC power-saving mode M3 (Step S214). That is to say, at Step S214, the NIC 26 generates the response packet using the PHY 265, the packet filter 268, and the packet generator 269, and sends the generated response packet to the network (not illustrated) (Step S214).

The address resolution protocol (ARP) will now be described. An ARP is a protocol for obtaining a MAC address from an internet protocol (IP) address. In an ARP, a host computer (personal computer, PC) queries the MAC address of the device coupled to the network using an ARP request packet. The queried device sends back an ARP response packet in which the MAC address allocated to the electronic device is written.

The ARP response packet as a response packet to the ARP request is generated by only writing the MAC address allocated to the electronic device in a format of the ARP response packet. Therefore, in the present embodiment, response processing to the ARP request packet is network response processing with a small hardware processing load, which can respond using only the PHY 265, the packet filter 268, and the packet generator 269 of the NIC 26 without using the CPU 261 of the NIC 26.

A Ping will now be described. A Ping is a communication protocol used for checking the status of the other party's computer or the communication line on a transmission control protocol (TCP)/internet protocol (IP) network such as the Internet. In a Ping, a host computer (personal computer, PC) sends a Ping packet for checking the status to the other party's computer. By checking the returning time of the Ping response packet, the status is recognized.

The Ping response packet as a response packet to the Ping packet for checking the status is a packet with a small amount of predetermined data used as a response. Therefore, in the present embodiment, response processing to the Ping packet for checking the status is network response processing with a small hardware processing load, which can respond using only the PHY 265, the packet filter 268, and the packet generator 269 of the NIC 26 without using the CPU 261 of the NIC 26.

As an example of specific processing at Steps S213 and S214, the processing at Steps S213 and S214 when the received packet is an ARP request packet addressed to the electronic device will now be described.

In this example, at Step S213, the packet filter 268 determines that the received packet (i.e., the ARP request packet) can respond in the NIC power-saving mode M3 because the communication protocol of the received packet is an "ARP" (Yes at Step S213). At the subsequent Step S214, the packet filter 268 sends the received ARP request packet to the packet generator 269. At the same Step S214, the packet filter 268 extracts the necessary data out of the received packet by the packet generator 269; generates the ARP response packet in which the MAC address allocated to the electronic device and stored in a certain storage unit is written; and sends the generated ARP response packet through the packet filter 268 and the PHY 265 to the network (not illustrated).

As another example of specific processing at Steps S213 and S214, the processing at Steps S213 and S214 when the received packet is a Ping packet for checking the status addressed to the electronic device will now be described.

In this example, at Step S213, the packet filter 268 determines that the received packet (i.e., the Ping packet for checking the status) can respond in the NIC power-saving mode M3 (Yes at Step S213) because the communication protocol of the received packet is a "Ping". At the subsequent Step S214, the packet filter 268 sends the Ping packet for checking the status to the packet generator 269. At the same Step S214, the packet filter 268 extracts the necessary data out of the received packet by the packet generator 269, generates the Ping response packet with a small amount of predetermined data used as a response, and sends the Ping response packet through the packet filter 268 and the PHY 265 to the network (not illustrated).

With reference to FIG. 8 again, as a result of the determination at Step S213, if the packet filter 268 determines that the packet cannot respond in the NIC power-saving mode M3 (No at Step S213) because the received packet is a packet that cannot respond without starting up the CPU 261 of the NIC 26, e.g., a simple network management protocol (SNMP) packet or a transmission control protocol (TCP) packet, the data stored in the RAM 263 or another memory module in the NIC 26 is moved to an HDD (not illustrated) to ensure the safety of the data, for example, to prepare for returning from the NIC power-saving mode M3 to the controller power-saving mode M2(Step S215).

The packet relating to the communication protocol such as an SNMP and a TCP may have a large amount of data; the content of the data of the packet may change from time to time; or the packet needs to respond after checking the connection status to the other party. Therefore, in the present embodiment, response determined as processing to the SNMP packet or the TCP packet is a processing with a large hardware processing load, which cannot respond by using only the PHY 265, the packet filter 268, and the packet generator 269 of the NIC 26 and without using the CPU 261 of the NIC 26.

After the preparing processing at Step S215, the power supply switching control unit 10 switches the electrical power supply to the loads from the electrical power supply from the energy generation unit 7 to the electrical power supply from the storage battery 8 (Step S216). After that, the image processing apparatus 1 proceeds to the controller power-saving mode M2 (Step S217) and operates with the electrical power supplied from the storage battery 8.

Subsequently, the image processing apparatus 1 proceeds the processing to Step S214; generates the response packet for the received packet (the SNMP packet or the TCP packet) under the control of the CPU 261 of the NIC 26; and sends the generated response packet to the network (not illustrated).

According to the embodiment described above, the electrical power consumption of the storage battery (accumulating unit) in a standby operation mode such as the controller power-saving mode M2 and the NIC power-saving mode M3 can be reduced; thus the time period in which the power consumption of the utility power supply is 0 W in the standby operation mode can be maintained longer; whereby further energy saving can be achieved than the related art.

An exemplary embodiment has been described above, however, the embodiment of the present invention is not limited to the above-described embodiment.

For example, in the above-described embodiment, the modules such as the energy generation unit 7, the storage battery 8, and the charging and discharging control unit 9 are provided inside of the image processing apparatus 1 (refer to FIG. 1). However, the embodiment is not limited to this example. The modules can be provided outside of the image processing apparatus 1. With this structure, if any one of the modules breaks down and no longer functions, the failing module that is provided outside of the apparatus can be readily replaced alone with the new one; whereby the whole of the image processing apparatus 1 can be maintained more easily and less expensive than replacing or repairing the entire image processing apparatus 1.

In the above-described embodiment, a stabilization circuit (regulator) for stabilizing the electrical power directly supplied from the energy generation unit 7 to the load may be provided. With this structure, the electrical power directly supplied from the energy generation unit 7 to the load can be stabilized in the NIC power-saving mode M3.

The computer program that performs processing in the controller 2 or the NIC 26 according to the above-described embodiment may be provided in a manner installed in a storage unit such as the ROM 21, the ROM 262, or another ROM (not illustrated) of the image processing apparatus 1 in advance. The computer program above may also be provided in a manner recorded as an installable or executable file format in a computer-readable recording medium. The computer program above may also be provided or distributed over a network such as the Internet.

According to the embodiment, the electrical power consumption of an accumulating unit during a standby operation mode is reduced; and a time period in which the power consumption of a utility power supply is 0 W in the standby operation mode can be maintained longer, whereby further energy saving can be achieved than the related art.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic device comprising:
an energy generation unit that generates electrical power;
an accumulating unit that accumulates therein the electrical power generated by the energy generation unit; and
a network control unit that comprises:
  a first function unit that performs network response processing;
  a second function unit that performs network response processing with a relatively smaller processing load than the network response processing performed by the first function unit; and
  a third function unit that controls the electrical power supply to the function units, wherein
the third function unit
  stops the electrical power supply to the first function unit in a predetermined standby operation mode that is standby for a network response request, and
  supplies the electrical power to the second function unit directly from the energy generation unit bypassing the accumulating unit.

2. The electronic device according to claim 1, wherein
when a network response request with a small processing load is received in the predetermined standby operation mode, the second function unit
  operates with the electrical power supplied from the energy generation unit and
  performs network response processing corresponding to the received network response request.

3. The electronic device according to claim 2, wherein
the network response request with a small processing load is reception of an address resolution protocol (ARP) request packet, and
the second function unit
  generates an ARP response packet in which the MAC address allocated to the electronic device is written and
  sends the ARP response packet to a network as the network response processing.

4. The electronic device according to claim 2, wherein
the network response request with a small processing load is reception of a Ping packet for checking the status, and
the second function unit
  generates the Ping packet for response and
  sends the Ping packet for response to a network as the network response processing.

5. The electronic device according to claim 1, wherein
when a network response request relating to the network response processing that the first function unit can perform and that the second function unit cannot perform is received in the predetermined standby operation mode, a power supply control unit
  supplies electrical power from the accumulating unit to the first function unit and the second function unit and shifts the apparatus to another standby operation mode, and in the another standby operation mode, the first function unit and the second function unit
operate with the electrical power supplied from the accumulating unit and
perform network response processing corresponding to the received network response request.

6. The electronic device according to claim 5, wherein
the network response request with a small processing load is reception of an address resolution protocol (ARP) request packet, and
the second function unit
generates an ARP response packet in which the MAC address allocated to the electronic device is written and
sends the ARP response packet to a network as the network response processing.

7. The electronic device according to claim 5, wherein
the network response request with a small processing load is reception of a Ping packet for checking the status, and
the second function unit
generates the Ping packet for response and
sends the Ping packet for response to a network as the network response processing.

8. The electronic device according to claim 1, wherein
the second function unit comprises:
a packet filter that determines a type of a communication protocol of the received packet; and
a packet generator that
extracts necessary data for a response out of the packet forwarded by the packet filter and
generates a response packet.

9. The electronic device according to claim 1, wherein when the electrical power supply from the energy generation unit is unstable, the electrical power supply is switched from the electrical power supply from the energy generation unit to the electrical power supply from the accumulating unit or electrical power supply from a utility power supply.

10. An image processing apparatus comprising:
an energy generation unit that generates electrical power;
an accumulating unit that accumulates therein the electrical power generated by the energy generation unit;
a network control unit that comprises:
a first function unit that performs network response processing;
a second function unit that performs network response processing with a relatively smaller processing load than the network response processing performed by the first function unit; and
a third function unit that controls the electrical power supply to the function units; and
an image processing unit that performs image processing, wherein
the third function unit stops the electrical power supply to the first function unit in a predetermined standby operation mode that is standby for a network response request, and supplies the electrical power to the second function unit directly from the energy generation unit bypassing the accumulating unit.

11. A device control method executed by an electronic device that comprises:
an energy generation unit that generates electrical power;
an accumulating unit that accumulates therein the electrical power generated by the energy generation unit; and
a network control unit that comprises:
a first function unit that performs network response processing;
a second function unit that performs network response processing with a relatively smaller processing load than the network response processing performed by the first function unit; and
a third function unit that controls the electrical power supply to the function units, the device control method comprising:
stopping, by the third function unit, the electrical power supply to the first function unit in a predetermined standby operation mode that is standby for a network response request, and
supplying the electrical power to the second function unit directly from the energy generation unit bypassing the accumulating unit.

* * * * *